(12) United States Patent
Gardiner

(10) Patent No.: US 8,681,154 B1
(45) Date of Patent: Mar. 25, 2014

(54) ADAPTIVE RENDERING OF INDISTINCT OBJECTS

(75) Inventor: Harold D. Gardiner, Sandy, UT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 307 days.

(21) Appl. No.: 12/837,266

(22) Filed: Jul. 15, 2010

(51) Int. Cl.
*G06T 15/00* (2011.01)
*G06T 1/60* (2006.01)

(52) U.S. Cl.
CPC ............... *G06T 15/005* (2013.01); *G06T 15/00* (2013.01); *G06T 1/60* (2013.01); *G03T 2210/36* (2013.01)
USPC .......................................... 345/428; 345/531

(58) Field of Classification Search
CPC ............. G06T 5/00; G06T 1/60; G06T 15/00; G06T 15/005; G06T 2210/36; G09G 5/391
USPC ........................................................ 345/428
See application file for complete search history.

(56) References Cited

U.S. PATENT DOCUMENTS

| | | | | |
|---|---|---|---|---|
| 5,420,970 | A * | 5/1995 | Steiner et al. | 345/627 |
| 5,488,687 | A | 1/1996 | Rich | |
| 5,867,166 | A * | 2/1999 | Myhrvold et al. | 345/419 |
| 6,809,731 | B2 | 10/2004 | Muffler et al. | |
| 2007/0229503 | A1 * | 10/2007 | Witzel et al. | 345/428 |
| 2009/0154804 | A1 * | 6/2009 | Nacman et al. | 382/167 |

OTHER PUBLICATIONS

"The Framebuffer," Chapter 10, Open GL Programming Guide, printed from website http://glprogramming.com/red/chapter10.html on Jul. 15, 2010, 27 pages.
Weaver et al., "Perceptually Adaptive Rendering of Immersive Virtual Environments," *Smart Graphics*, 8th International Symposium, SG 2007, Kyoto, Japan, Jun. 2007, cover page and pp. 224-229.

* cited by examiner

*Primary Examiner* — Kee M Tung
*Assistant Examiner* — Ryan D McCulley
(74) *Attorney, Agent, or Firm* — Donna P. Suchy; Daniel M. Barbieri

(57) ABSTRACT

Rendering of objects techniques can include a method, a system, and a graphics device. The method can include receiving data for one or more objects. The data for each object can include a fidelity code, wherein the fidelity code indicates object fidelity level. The method further can include computing pixels touched by each received object based on a pixel grid associated with the fidelity code of the object. The method further can include providing pixel data for objects having fidelity code indicating a lower fidelity object.

7 Claims, 9 Drawing Sheets

ADAPTIVE RENDERING OF INDISTINCT OBJECTS

BACKGROUND OF THE INVENTION

The present disclosure relates generally to the field of computer generated imagery or graphics. Computer generated imagery is utilized in various applications including cinematic applications, video game applications, and training applications such as flight simulator applications. Generally, increased fidelity in both scene density and screen resolution is desirable in computer generated imagery applications. In addition, more realistic atmospheric and weather effects are desired.

Certain computer generated applications, such as, interactive computer graphics applications, rely on a three dimensional (3D) digital database to represent the virtual environment. In general, the designers of that environment exploit the capabilities of the target graphics platform which processes data to produce the 3D environment. To achieve as much fidelity as possible, the designers often populate the database with as much scene content as the target platform engine is capable of processing. Therefore, the target platform engine and the system within which it resides may be frequently running at near full processing capacity.

The general trend in computer graphics evolution is to continually increase scene density and screen resolution. Each new generation of graphics hardware for the graphics engine provides ever increasing levels of performance. Some applications are striving to achieve eye-limiting resolution for the observer. Such levels of resolution are a lofty goal which require significant expense.

To reduce costs associated with high levels of performance, a number of strategies have been developed that provide high-fidelity in critical areas of interest while providing lower levels of fidelity elsewhere. Some strategies mix the differing resolution regions of the screen within a single graphics device, while others attempt to merge multiple video streams.

Furthermore, some systems allow the user to configure the system to trade off image quality for rendering performance. For example, it may be possible to render a scene with fewer anti-aliasing samples or fewer texture samples in order to support a higher screen resolution.

Many systems have managed scene complexity with various level-of-detail strategies which reduce the primitive count for objects that are either far away or outside the area of interest. However, these schemes alter the number of primitives that are rendered and not the methodology used to render. When special effects such as explosions, smoke, dust, or weather effects are added to the system, the system can become overloaded.

Thus, a need exists for an adaptive rendering scheme that renders special effects much faster, but at a lower level of fidelity. Further, there is a need for a graphics engine for employing such a scheme. Further still, there is a need for a method of and a system for rendering more complex special effects without causing system overload. Yet further, there is a need for flight simulation having improved realism by efficiently providing more realistic atmospheric and weather effects.

SUMMARY OF THE INVENTION

One approach to rendering objects is a method. The method includes receiving data for one or more objects. The data for each object includes a fidelity code, wherein the fidelity code indicates object fidelity level. The method further includes computing pixels touched by each received object based on a pixel grid associated with the fidelity code of the object. The method further includes providing pixel data for objects having fidelity code indicating a lower fidelity object.

Another approach to rendering objects is a system. The system includes a render controller being configured to determine which pixels are touched by objects based on a fidelity code associated with each object. The fidelity code of each object indicates object fidelity level. The system further includes a graphics pipeline being configured to compute the color for each pixel and pixel coverage data for objects with multiple fidelity levels. The system further includes a fluffing logic being configured to provide pixel data for objects having lower fidelity levels. The system further includes a depth buffer being configured to resolve visual priority of objects. The system further includes a frame buffer being configured to store final pixel data.

Another approach to rendering objects is a graphics device. The device includes a render controller being configured to receive data associated with objects, wherein a fidelity code is associated with each object indicating object fidelity level. The render controller is further configured to determine pixels touched by the received objects based on the fidelity code associated with each object and a pixel grid associated with each fidelity code. The device further includes a graphics pipeline being configured to compute the color for each pixel and pixel coverage data. The device further includes a fluffing logic being configured to provide sub-pixel data for objects having lower fidelity level sub-pixels. The device further includes a depth buffer being configured to resolve visual priority of objects. The device further includes a frame buffer being configured to store final pixel color. The device further includes an anti-aliasing filter being configured to perform anti-aliasing on the pixel data stored in the frame buffer. The fluffing logic further configured to store provided sub-pixel data into the depth buffer and the frame buffer.

Other aspects and advantages of the present invention will become apparent from the following detailed description, taken in conjunction with the accompanying drawings, illustrating the principles of the invention by way of example only.

BRIEF DESCRIPTION OF THE DRAWINGS

Various embodiments taught herein are illustrated by way of example, and not by way of limitation, in the figures of the accompanying drawings, in which.

It will be recognized that some or all of the figures are schematic representations for purposes of illustration and do not necessarily depict the actual relative sizes or locations of the elements shown. The figures are provided for the purpose of illustrating one or more embodiments of the invention with the explicit understanding that they will not be used to limit the scope or the meaning of the claims.

DETAILED DESCRIPTION OF THE PREFERRED EMBODIMENTS

Before turning to the figures which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Figure 1:
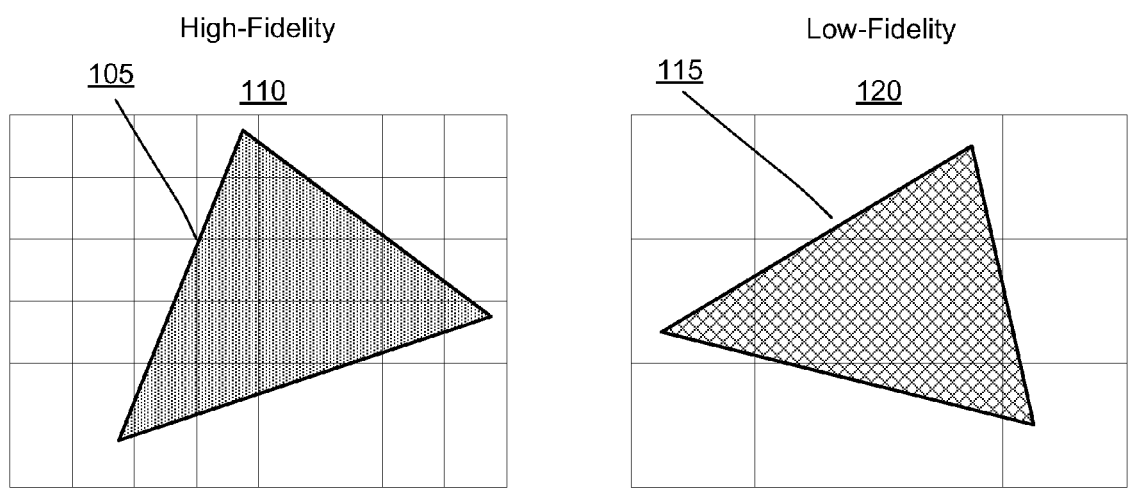
FIGS. 1-2 are diagrams illustrating exemplary polygons, according to one exemplary embodiment.

FIG. 1 illustrates an exemplary pixel rendering of a set of polygons. A "high-fidelity" polygon 105 is shown as it overlays a portion of a pixel structure 110. A "low-fidelity" polygon 115 is shown as it overlays a portion of a pixel structure 120, rendered at lower fidelity than the "high-fidelity" polygon 105. In some embodiments, pixels in the pixel structures rendering lower fidelity polygons may be larger than pixels in the pixel structures rendering higher fidelity polygons. As illustrated, the pixels shown in the pixel structure 120 are twice as large both horizontally and vertically than the pixels shown in the pixel structure 110.

Figure 2:
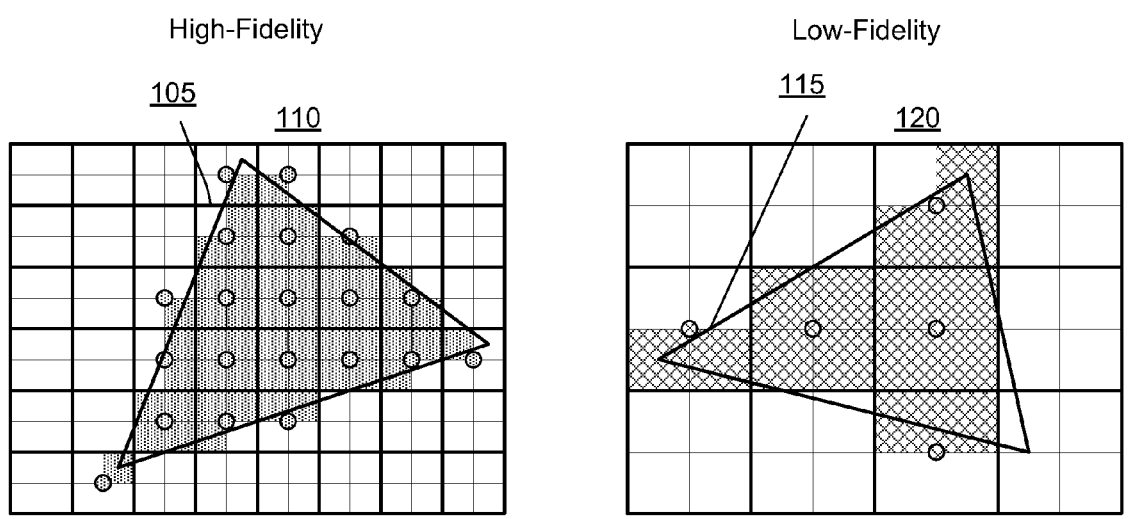

As illustrated in FIG. 2, each pixel in the pixel structures 110 and 120 is sub-divided into a two-by-two grid representing sub-pixels. The resulting sub-pixels may be used for anti-aliasing. Although a two-by-two grid is illustrated in FIG. 2, each pixel may be divided into any number of sub-pixels (e.g., 16, 32, etc.) In some embodiments, polygons 105 and 115 are allocated to sub-pixels based on coverage. As illustrated, the high-fidelity polygon 105 touches twenty pixels, while the low-fidelity polygon 110 touches five pixels.

The small circles shown in each pixel in the pixel structures 110 and 120 indicate the pixel centers, where the color may be computed for each pixel. In some embodiments, that color may be applied to each sub-pixel touched by the polygon within that pixel. The low-fidelity polygon 115 touches fewer pixels, and, as a result, requires fewer color values to be computed. Similarly, the low-fidelity polygon 115 touches fewer sub-pixels. Consequently, for the low-fidelity polygon 115, there is less work involved to perform anti-aliasing. The loss of color fidelity and sub-pixel fidelity may result in a lower quality rendering.

Figure 3A:
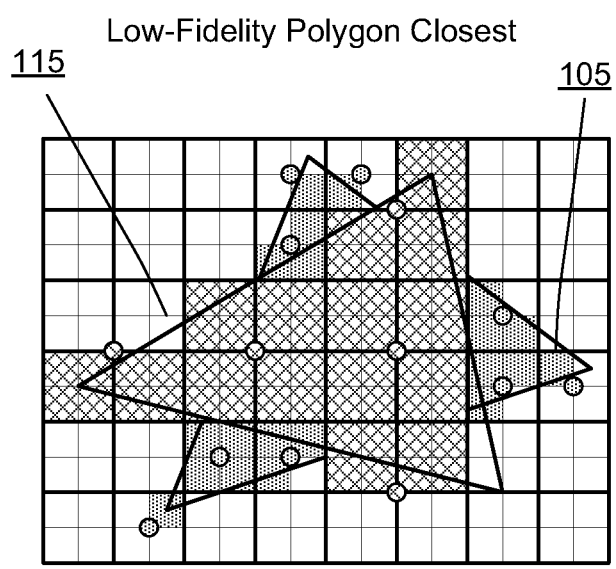
FIGS. 3A-3B are diagrams illustrating merging of polygons, according to one exemplary embodiment.
Figure 3B:
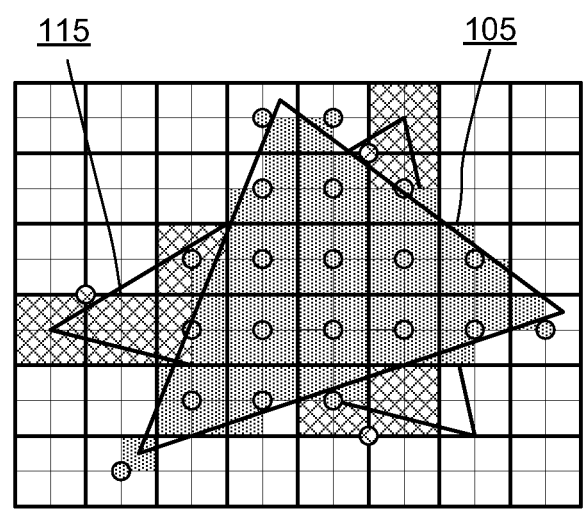

FIGS. 3A-3B illustrate merging high and low fidelity renderings, according to an exemplary embodiment. In some embodiments, high and low fidelity primitives are merged based on their visual priority. As illustrated in FIG. 3A, the "low-fidelity" polygon 115 has visual priority over the high-fidelity polygon 105. In some embodiments, in order to merge the two polygons, each low-fidelity sub-pixel may be "fluffed up" (e.g., expanded) to fill in the high-fidelity sub-pixel structure 110. The sub-pixel data may be "smeared" across multiple sub-pixels and the color values are "smeared" across multiple pixels. In these embodiments, even though the "low-fidelity" polygon 115 data has been "fluffed up", it is still low in fidelity.

As illustrated in FIG. 3B, the "high-fidelity" polygon 105 has visual priority over the "low-fidelity" polygon 115. As shown, where the "low-fidelity" polygon 115 is visible, its data is "smeared" or "fluffed up" to fill the high-fidelity pixel structure 110. The high-fidelity polygon 105, where visible, maintains its full fidelity.

In some embodiments, the "fluffing up" process includes converting the low-fidelity rendering to a high-fidelity rendering by replicating sub-pixel values. In these embodiments, an indistinct low-fidelity object is fluffed up so that it can be merged into the scene containing high-fidelity objects. One of the considerations during the merging process is bandwidth utilization. Although rendering a low-fidelity primitive takes less time and resources, merging it into a high-fidelity frame buffer may require additional bandwidth. In these embodiments, each low-fidelity sub-pixel needs to write its color into several (e.g., four) high-fidelity sub-pixels. In order to provide an increase in rendering performance, the low-fidelity pixel may need to write a greater number of sub-pixels (e.g., sixteen sub-pixels) in the same amount of time that a high-fidelity pixel would have written a smaller number of sub-pixels (e.g., four sub-pixels).

Figure 4:
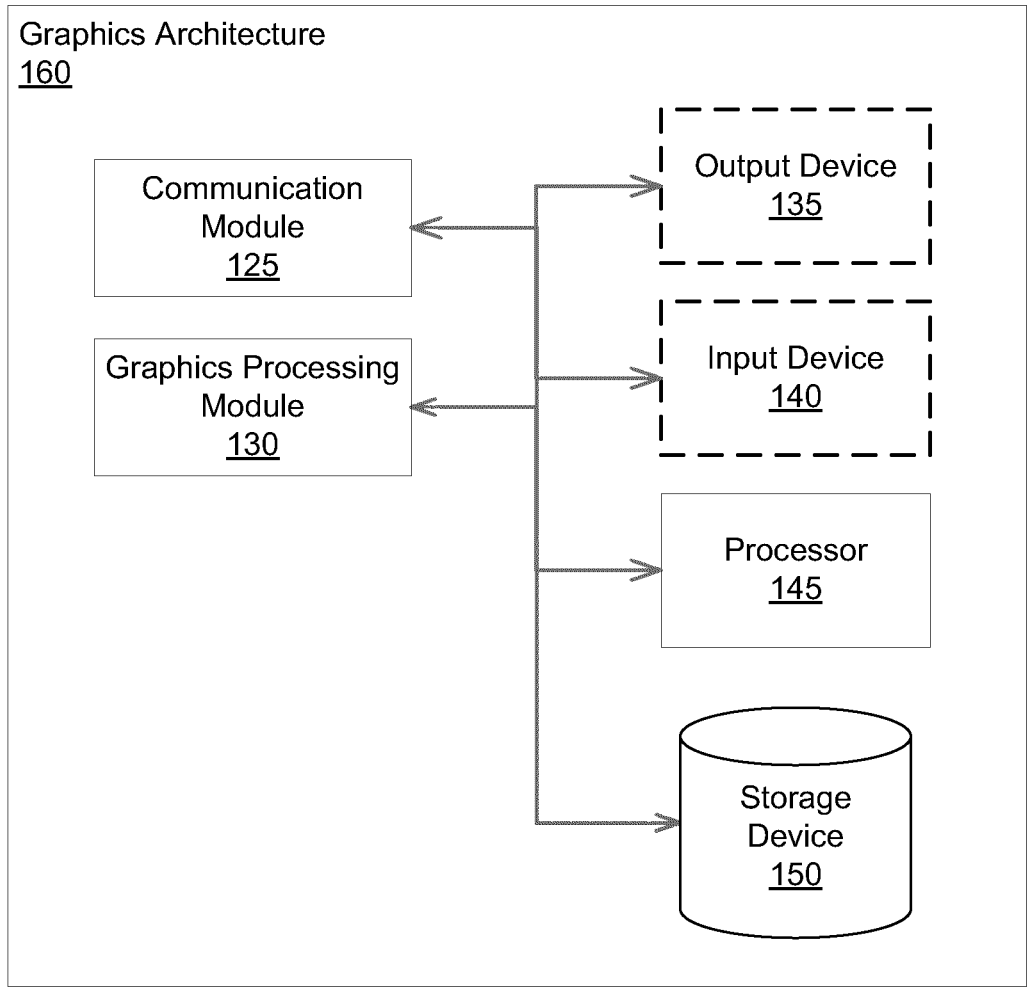
FIG. 4 is a block diagram illustrating an exemplary graphics architecture, according to one exemplary embodiment.

FIG. 4 illustrates exemplary hardware and software components of the exemplary graphics architecture 160. As illustrated in FIG. 4, the graphics architecture 160 may include a communication module 125, a graphics processing module 130, an output device 135, an input device 140, a processor 145, and a storage device 150. The modules and/or devices can be hardware and/or software. The modules and/or devices illustrated in the graphics architecture 160 can, for example, utilize the processor 145 to execute computer executable instructions and/or include a processor to execute computer executable instructions (e.g., a field programmable gate array processing unit, etc.). It should be understood that the graphics architecture 160 can include, for example, other modules, devices, and/or processors known in the art and/or varieties of the illustrated modules, devices, and/or processors. It should be understood that the modules and/or devices illustrated in the graphics architecture 160 can be located within the graphics architecture 160 and/or connected to the graphics architecture 160 (e.g., directly, indirectly, etc.), but outside of the physical components of the graphics architecture (e.g., personal computer, mobile device, etc.).

The communication module 125 communicates data to/from the graphics architecture 160. The graphics processing module 130 controls processing of distinct and indistinct primitive objects and producing graphics images and videos. In some embodiments, the graphics processing module 130 may include the "fluffing" logic illustrated in FIG. 5. In other embodiments, the "fluffing" logic may be implemented in the processor 145. In some embodiments, primitives of different fidelities can be rendered by the same graphics processing module 130 (or graphics engine) and be combined in a visually correct way in a frame buffer.

The output device 135 outputs information and/or data associated with the graphics architecture 160 (e.g., information to a display (not shown), information to a printer, information to a speaker, etc.). The input device 140 receives information associated with the graphics architecture 160 (e.g., instructions from a user, instructions from a computing device, etc.) from a user (not shown) and/or a computing system (not shown). The input device 140 can include, for example, a keyboard, a scanner, a touch screen, etc. For example, the user may enter or update fidelity codes for various objects processed by the graphics architecture 160 using the input device 140.

The processor 145 executes the operating system and/or any other computer executable instructions for the graphics architecture 160 (e.g., executes applications, etc.). The graphics architecture 160 can include random access memory (not shown). The random access memory can temporarily store the operating system, the instructions, and/or any other data associated with the graphics architecture. The random access memory can include one or more levels of memory storage (e.g., processor register, storage disk cache, main memory, etc.).

The storage device 150 stores information associated with various objects including fidelity codes, various pixel grids, pixel data, an operating system and/or any other data or program code associated with the graphics architecture 160. The storage device can include a plurality of storage devices. The storage device 150 can include, for example, long-term storage (e.g., a hard drive, a tape storage device, flash memory, etc.), short-term storage (e.g., a random access memory, a graphics memory, etc.), and/or any other type of computer readable storage.

Figure 5:
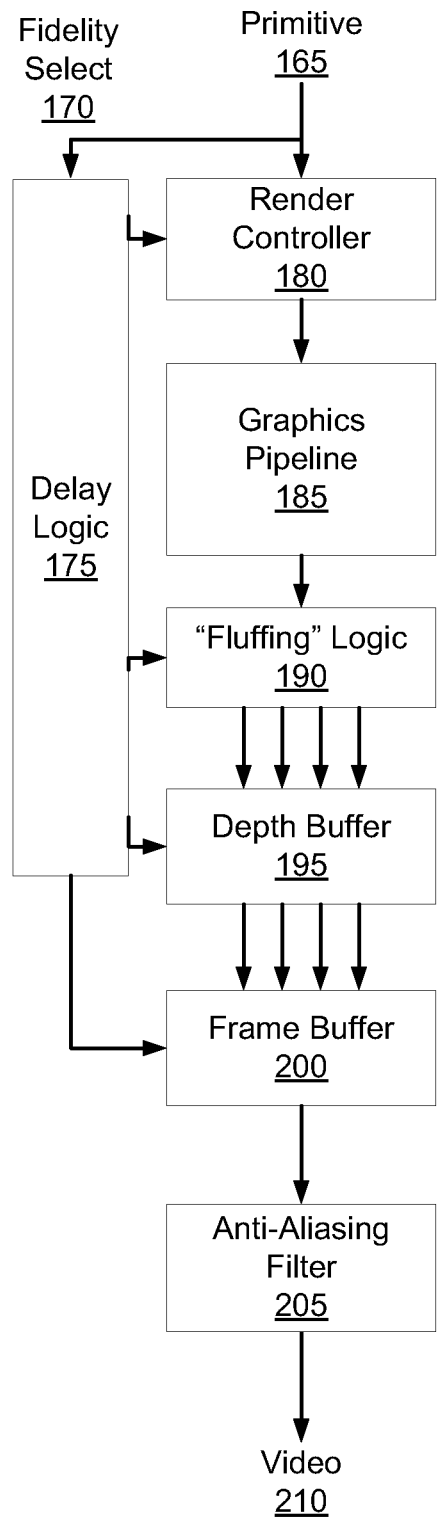
FIG. 5 is a block diagram illustrating an exemplary graphics architecture, according to one exemplary embodiment.

FIG. 5 illustrates a graphics architecture 160 configured to support adaptive rendering of select primitives. Graphics architecture 160 can advantageously provide a rendering scheme such as an adaptive rendering scheme that can be applied on a primitive-by-primitive basis. In one embodiment, rather than trying to provide higher-fidelity resolution for critical objects, the rendering scheme preferably provides lower fidelity for indistinct objects that cannot benefit from high fidelity. Indistinct objects can be puffs of smoke, weather effects, atmospheric effects, explosions, or other special effects. Applicants believe that it can be inefficient to render indistinct objects at the same high level of fidelity as other distinct objects in the scene.

According to another embodiment, architecture 160 can employ an adaptive rendering scheme that is adaptable on a primitive-by-primitive basis. Rather than trading image quality for performance on the entire screen or a subset of the screen, the scheme trades it only on "indistinct" primitives that do not require the higher levels of fidelity. According to such an embodiment, architecture 160 can render indistinct objects at a fast rate so that other more important objects can utilize the full fidelity offered by the graphics platform.

Graphics architecture 160 is shown to include a render controller 180, a delay logic 175, a graphics pipeline 185, a "fluffing" logic 190, a depth buffer 195, a frame buffer 200, and an anti-aliasing filter 205. In some embodiments, the primitives come into the graphics architecture 160 one by one. In these embodiments, as soon as the render controller 180 finishes processing one primitive, it starts processing another primitive, even though the first primitive may still be in the graphics pipeline. The primitives may come in as fast as the render controller 180 can process them. The primitive objects may include polygons, bezigons, lines, polylines, circles, eclipses, Bezier curves, text, bitmap images, etc.

In some embodiments, a fidelity code 170 is associated with each primitive or object 165 indicating a fidelity level of the object. In some embodiments, a first fidelity code may indicate a low fidelity object and a second fidelity code may indicate a high fidelity object. In other embodiments, fidelity codes may indicate multiple levels of fidelity.

In the graphics pipeline, a different polygon may be processed at every stage of the pipeline. Each stage may need to know whether a polygon being processed is a "low-fidelity" polygon. In some embodiments, the delay logic 175 provides the fidelity code to the different stages of the graphics pipeline as data flows down the pipeline. For example, if a first polygon is being processed by the render controller 180, the render controller 180 needs to know the fidelity code of the first polygon. Then, when the render controller 180 finishes processing the first polygon and moves onto a second polygon, the "fluffing" logic 190 needs to know if the first polygon is a "low-fidelity" object. In other embodiments, each stage in the graphics pipeline would determine whether an object being processed is a "low-fidelity" object by checking the fidelity code passed with the object, and without receiving the fidelity code from a separate logic such as the delay logic 175.

The render controller 180 is configured to determine which pixels need to be processed to render the primitive 165. The render controller 180 is configured to compute which pixels on the screen are touched by the incoming primitive 165. The render controller 180 may select pixels to render based on the selected level of fidelity. If the primitive 165 has a lower level of fidelity, the render controller 180 may compute the pixel touch list based on a lower-fidelity pixel grid. The graphics pipeline 185 is configured to compute the color for each pixel (including texture, lighting, visibility effects, etc.) as well as the pixel coverage data. The graphics pipeline 185 further performs graphics processing including computing texture values, color values, fog functions, etc. The graphics pipeline 185 may utilize various graphics algorithms. In some embodiments, primitives of different fidelities can be rendered by a single graphics pipeline (e.g., graphics pipeline 185).

Once the pixel's color and sub-pixel mask is known, the "fluffing" logic 190 may "fluff up" the data. In some embodiments, for high fidelity primitives, the "fluffing" logic 190 may act as a de-multiplexor, and send each pixel to the appropriate interface in the depth buffer 195. For example, as data comes out of the graphics pipeline 185 for a high fidelity object, the "fluffing" logic 190 may route the data into one of the four arrows in the depth buffer 195. In this example, it may take four cycles to write four pixels into the depth buffer 195. The depth buffer 195 is configured to compare depth of overlapping objects, and keep the closest object, discarding the other object.

The data for "low-fidelity" primitives may be written into multiple pixel addresses within the depth buffer 195 and the frame buffer 200. In some embodiments, multiple pixels are written into the depth and frame buffers simultaneously. For example, the "fluffing" logic 190 may take one pixel out of the graphics pipeline 185 and write it into four pixels at the same time into the depth buffer 195. In some embodiments, a single graphics pipeline is utilized with a parallel depth or frame buffer such that the "fluffing" logic 190 may parallel process pixels for low fidelity objects and sequentially process pixels for high fidelity objects. The rendering performance can be advantageously increased significantly without the high cost associated with replicating the graphics pipeline to compute color values for all of those pixels. For applications that require deterministic rendering rates (e.g., simulation applications), the adaptive rendering of indistinct objects (e.g., clouds, puff of smoke) provides great leverage. In some embodiments, the "fluffing" logic 190 may expand low fidelity pixels to match the resolution of high fidelity pixels. In these embodiments, the "fluffing" logic 190 may replicate the low fidelity pixels, perform bilinear filtering, average low fidelity pixels, and/or perform another scheme to expand the low fidelity pixels.

The depth buffer 195 is configured to resolve visual priority by keeping the primitives that are closest to the viewer. Pixels or sub-pixels surviving the depth test are passed to the frame buffer 200, which stores the final pixel or sub-pixel color. The final frame buffer color values are passed through the anti-aliasing filter 205 to produce the final video stream 210.

Figure 6:
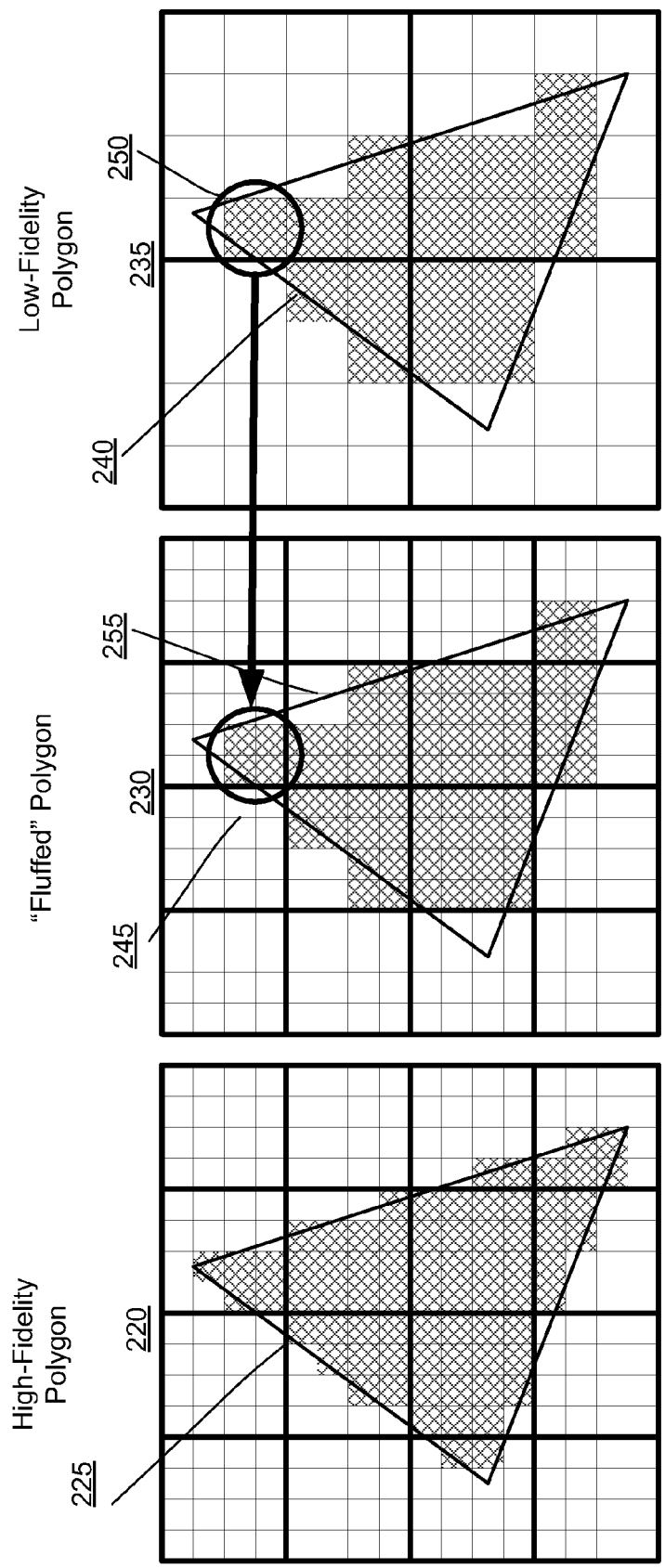
FIGS. 6-7 are diagrams illustrating processing of low-fidelity polygons, according to one exemplary embodiment.

FIG. 6 illustrates "fluffing" of a "low-fidelity" polygon. In some embodiments, the low-fidelity pixels are fluffed up to "match" the fidelity of the high resolution frame buffer so that the low fidelity primitives can be used in the same image as the high fidelity primitives. The "fluffed-up" low-fidelity pixels and high fidelity pixels need to match in order to perform depth buffer and frame buffer operations. In FIG. 6, an array of "high-fidelity" pixels 220 is shown, each pixel containing a grid of four-by-four sub-pixels. A rendered "high-fidelity" polygon 225 is shown in the shaded sub-pixels in the array of pixels 220. FIG. 6 also shows an array of "low-fidelity" pixels 235 containing a "low-fidelity" polygon 240, which is the same polygon as the polygon 225 but rendered at lower fidelity (i.e., half fidelity both horizontally and vertically in this example). As illustrated, the sub-pixels in the array of pixels 235 are larger, and the "fit" of the polygon 240 is not as good as the "fit" of the polygon 225. These lower-fidelity sub-pixels are "fluffed up" as shown in an array of pixels 230. The "fluffed up" sub-pixels may be stored in the high-fidelity frame buffer. In this example, each "low-fidelity" sub-pixel maps to a grid of two-by-two high-fidelity sub-pixels, as indicated within the circles 245 and 250. In other words, each low resolution sub-pixel "expands" to exactly four sub-pixels in the high resolution buffer (a 2×2 grid in this case). In other embodiments, a low resolution sub-pixel may expand to any number of high resolution sub-pixels (e.g., 1 to 2, 1 to 4, 1 to 5, 1 to 8, 1 to 16, etc.).

Although the "fluffed" up polygon 255 is rendered at a lower fidelity than the "high-fidelity" polygon 225, the "fluffed" up polygon 255 was rendered faster (e.g., approximately four times faster). In some embodiments, the result may be stored at full resolution so that depth testing and anti-alias filtering may be properly applied.

In some embodiments, the "fluffing" algorithm used by the "fluffing" logic may consider polygon edge anti-aliasing, transparency effects, color, and/or depth buffering. Polygon edge anti-aliasing may utilize a fluffing scheme as illustrated above, but transparency effects may suggest a different arrangement of mapping low-fidelity sub-pixels to high-fidelity sub-pixels.

In some embodiments, each computed low-fidelity sub-pixel may contain a depth value that must be associated with multiple depth values in the high-fidelity depth buffer. In order to perform a depth test on a low fidelity object within a high fidelity depth buffer, one or more strategies may be used to expand the low fidelity depth values. In some embodiments, each low-fidelity sample may be associated with one high-fidelity sample for the depth test. Considering the circles 245 and 255 in FIG. 6, the low-fidelity depth value could be tested with the upper-left sub-pixel in the high-fidelity depth buffer. If it wins the test, the resulting depth and color would then be written into all four high-fidelity samples associated with that low-fidelity sample. In other embodiments, one or more of the following samples may be used, alone or in combination, to perform the depth test on the "low-fidelity" object: the closest sample of the high fidelity samples, the furthest sample of the high fidelity samples, or the majority sample of the high fidelity samples. In other embodiments, the average depth of all associated samples may be taken. In other embodiments, multiple depth tests may be performed, one for each associated sample, and the majority would rule. For example, if more than half of the samples win the test, the "low-fidelity" sample would win. In other embodiments, if sufficient bandwidth and circuitry is available, each sub-pixel may perform its own test and decide independently whether to claim the sample or not.

Figure 7:
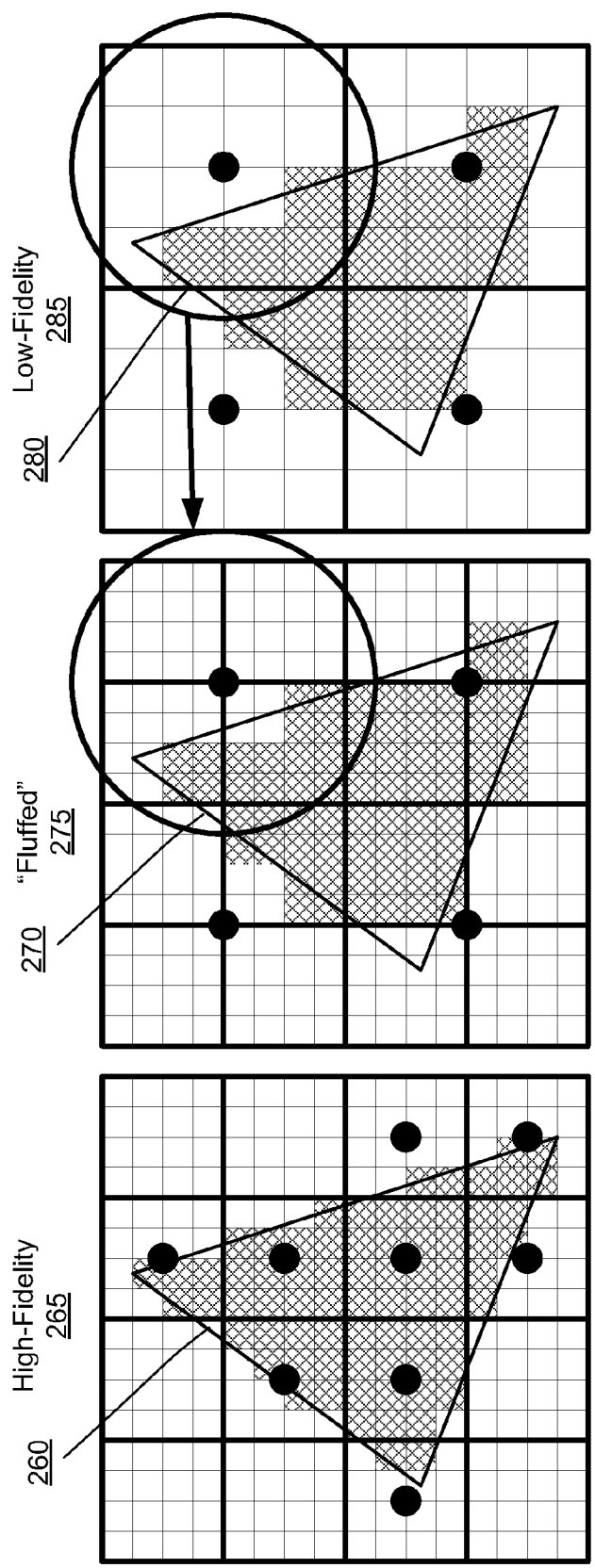

FIG. 7 illustrates pixel color "fluffing". In some embodiments, the graphics pipelines may compute one color per pixel. In these embodiments, the black dots shown in FIG. 7 may represent these color samples. For high fidelity image 265, a color sample may be computed for each pixel touched by a polygon 260. Similarly, one color sample may be computed per pixel in a low-fidelity image 285, although there are fewer pixels in the rendering. Each low-fidelity pixel color is fluffed up and stored in the frame buffer. In some embodiments, the low-fidelity color for all high-fidelity pixels within the same region is expanded. In these embodiments, the one low-fidelity pixel circled would have its color stored in the four high-fidelity pixels in the same location. In other embodiments, some form of blending may be applied so that each high-fidelity pixel obtains a unique color value that is derived from the nearest neighboring low-fidelity pixel colors. In these embodiments, simple bilinear blending could be used, or more complex filtering strategies.

Figure 8:
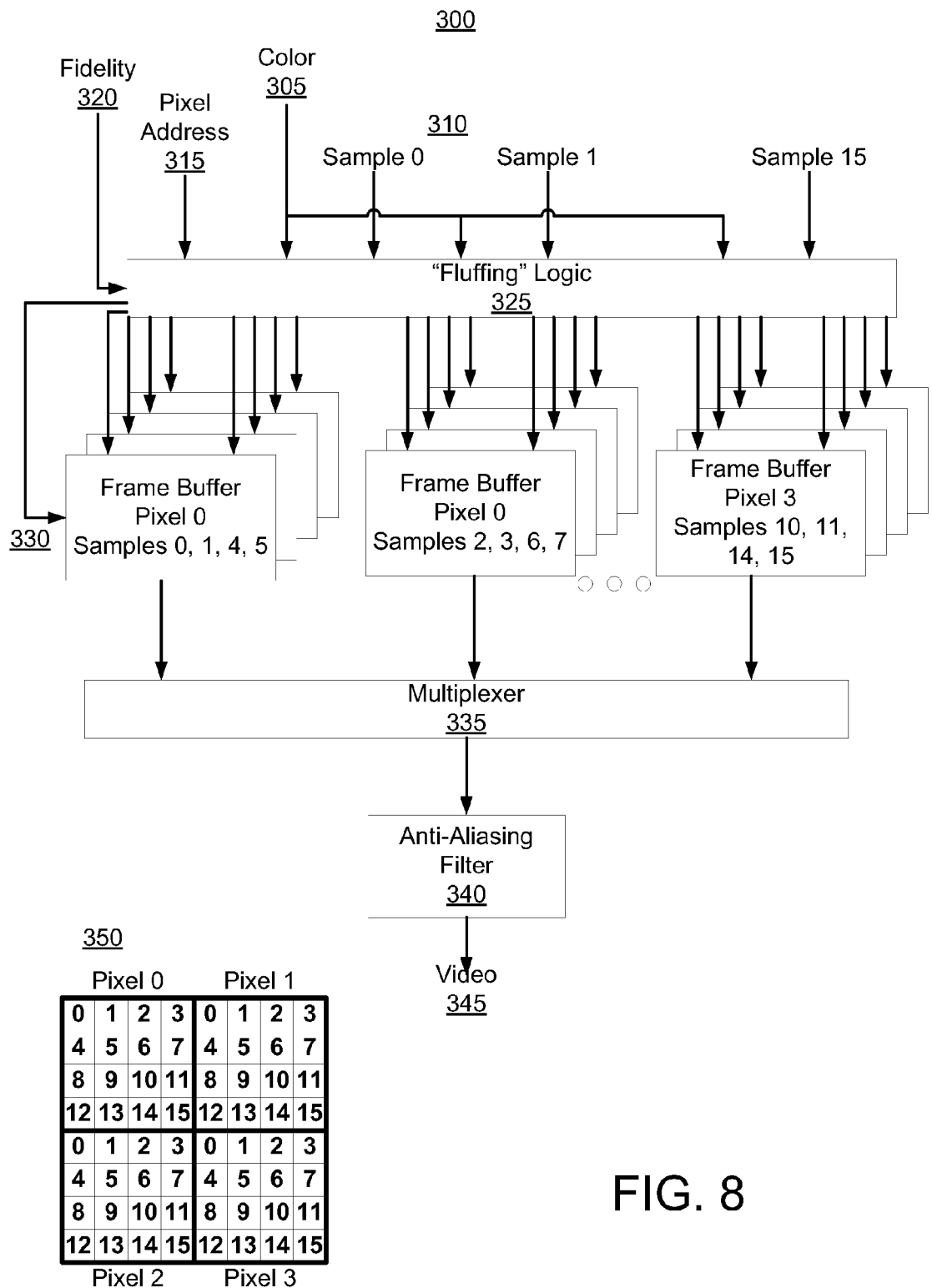
FIG. 8 is a block diagram illustrating an exemplary frame buffer architecture, according to one exemplary embodiment.

FIG. 8 illustrates an exemplary "adaptive" frame buffer architecture 300. A pixel structure 350 with its associated sub-pixels and a numbering scheme is also shown. The pixel structure 350 illustrates four pixels, each pixel consisting of 16 sub-pixels. Although each pixel in the pixel structure 350 consists of 16 sub-pixels, a pixel may be divided into any number of sub-pixels. The adaptive frame buffer architecture 300 includes a "fluffing" logic 325, a frame buffer memory structure 330, a multiplexer 335, and an anti-aliasing filter 340. Data including color 305, pixel address 315, and sub-pixel enables 310 come into the circuit, along with a fidelity select code 320. The fidelity code 320 indicates level of fidelity associated with an incoming primitive.

As shown, the frame buffer memory structure 330 is a memory array large enough to store the color and depth associated with each pixel to be rendered. The frame buffer 330 includes a chunk of memory for each sub-pixel (e.g., 16 memory chunks corresponding to the sub-pixels in the pixel structure 350). The frame buffer 330 may receive color 305 for a pixel along with a sample mask that indicates which of the sixteen samples are covered by an object. In some embodiments, there are sub-pixel coverage bits that enable the color (or depth) to be stored only for those sub-pixels covered by the primitive. For example, if a sample bit is enabled, then the color would get stored into that pixel location. Conversely, if the sample is not touched, then the data is not written into the frame buffer 330.

In some embodiments, the "fluffing" logic 325 connects a single graphics pipeline to a parallel depth and frame buffer system. Low fidelity pixels may be broadcast to the multiple depth or frame buffers in parallel, thereby providing the same performance as a full parallel graphics engine. High fidelity pixels may sequentially stream data to one of the four instances of depth and frame buffers, thereby having the same performance as the single pipeline. In these embodiments, the "fluffing" logic 325 acts as a de-multiplexer for high fidelity primitives and as an "expander" for low fidelity pixels. In some embodiments, the form used for the expansion of low fidelity pixels may contribute to the final quality of the image.

When rendering a high-fidelity primitive, the "fluffing" logic 325 may route color and sample data to the memory structures 330. The "fluffing" logic 325 may act as a de-multiplexing circuit to route the data to only those memories that should store the data. For example, when rendering pixel 0, the "fluffing" logic 325 would route the color and sample data to the sixteen memories associated with pixel 0. Similarly, when rendering pixels 1, 2, or 3, the fluffing logic 325 would route the data to corresponding memories.

When rendering a low-fidelity primitive, the "fluffing" logic 325 may "fluff" the color and sub-pixel data in a pre-defined manner (e.g., may be expanded). For example, a sample for a low fidelity object may be fluffed up to cover samples 0, 1, 4, and 5 in pixel 0. Similarly, another sample for the low-fidelity object may be fluffed up to cover samples, 2, 3, 6, and 7. Accordingly, four pixels may be written in one cycle, instead of one pixel in one cycle. For a "high-fidelity" object, the fluffing logic may take a sample and route it to either sample 0 in pixel 0, sample 0 in pixel 1, sample 0 in pixel 2, or sample 0 in pixel 3, depending on which of those four pixels is being processed. In the case of the "high-fidelity" object, it may take four cycles because four different outputs are received and processed from the graphics pipeline 335.

In some embodiments, a user manually defines which objects are indistinct. In these embodiments, the fidelity code associated with each object reflects whether the object is indistinct and may be rendered at a lower fidelity. In other embodiments, an automatic process automatically processes objects and determines if objects are indistinct, and updates the fidelity codes accordingly. Once the "fluffing" logic 325 "fluffs" the color and sub-pixel data, the result is broadcasted to all memories simultaneously, which advantageously increases performance. In this example, four pixels worth of data may be written in the same time it would take to write one pixel in high-fidelity mode.

Because the frame buffer memory 330 has been widened out in an interleave fashion, the multiplexer 335 may sequentially route pixel data to the anti-aliasing filter 340. In these embodiments, the "fluffing" logic 325 provides a "de-multiplexing" function, which is compensated for with a "multiplexing" function on the output.

The adaptive frame buffer architecture 300 may increase the cost and complexity of the graphics engine due to the depth buffer and color frame buffer supporting high bandwidth operations. However, the adaptive frame buffer architecture 300 does not require replication of the costly graphics pipeline that computes pixel color and coverage. Accordingly, the overall system performance may be increased with a minimal cost impact.

Although FIG. 8 only illustrates the color value 305, the same concepts may apply to depth. Once the entire scene has been rendered, the final sub-pixel colors are fed through an anti-aliasing filter 335 to produce the output video stream 345.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machine to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method for adaptively rendering objects in a computer graphic image using a non-parallelized graphics pipeline for low fidelity objects at a lower pixel resolution than higher fidelity objects, and maintaining data for the objects, wherein the data for each object includes a fidelity code, wherein the fidelity code indicates object fidelity level, the method comprising:

computing pixels touched by each object based on a pixel grid associated with the fidelity code of the object, wherein the pixel grid for a higher fidelity level comprises more pixels per area than the pixel grid for a lower fidelity level;

utilizing fluffing logic to expand pixel grid resolution to provide expanded pixel grids for the low fidelity objects to match the number of pixels per area of the pixel grid for the higher fidelity objects; and using the higher fidelity objects and the expanded pixel grids for the low fidelity objects to write pixel data to a depth buffer, wherein the fluffing logic is configured to provide the pixel data to at least one of the depth buffer and the frame buffer in parallel for a plurality of pixels touched by a low fidelity object using a parallel write, the parallel write being accomplished despite the non-parallelized graphics pipeline by taking one pixel out of the graphics pipeline and writing the one pixel into four or more pixels at the same time into the depth buffer or a frame buffer and wherein pixel data is written in sequence for a plurality of pixels touched by a higher fidelity object of the higher fidelity objects.

2. A system for adaptively rendering objects in a computer graphic image, the system comprising:

at least one electronic computer configured to provide:

a render controller being configured to determine pixels touched by objects based on a fidelity code associated with each object, wherein the fidelity code of each object indicates object fidelity level, wherein a pixel grid for the pixels associated with an object having a higher object fidelity level has more pixels per area than a pixel grid associated with an object having a lower object fidelity level;

a non-parallelized graphics pipeline being configured to compute the color for each pixel and pixel coverage data for each of the objects;

a fluffing logic being configured to provide pixel data for objects having lower object fidelity levels;

a depth buffer being configured to resolve visual priority of objects; and a frame buffer being configured to store final pixel data; and wherein the fluffing logic is configured to provide the pixel data to at least one of the depth buffer and the frame buffer in parallel for a plurality of pixels touched by an object with a lower object fidelity level using a parallel write, the parallel write accomplished despite the non-parallelized graphics pipeline by taking one pixel out of the graphics pipeline and writing the one pixel into four or more pixels at the same time into the depth buffer or frame buffer and wherein the pixel data is written in sequence for a plurality of pixels touched by an object with a higher object fidelity level.

3. The system of claim 2, wherein for each received object, the render controller being configured to compute pixel touch based on the pixel grid associated with the fidelity code of the object.

4. The system of claim 2, wherein a lower fidelity grid is associated with an object having a fidelity code indicating a lower object fidelity level, and a higher fidelity grid is associated with objects having a fidelity code indicating a higher object fidelity level.

5. The system of claim 4, wherein pixels in the lower fidelity grid are larger than pixels in the higher fidelity grid.

6. The system of claim 2, wherein the fluffing logic expands color associated with sub-pixels of objects having a lower fidelity object level.

7. A graphics device for adaptively rendering objects in a computer graphic image, the device comprising:

a render controller being configured to receive data associated with objects, wherein a fidelity code is associated with each object indicating object fidelity level, and determine pixels touched by the received objects based on the fidelity code associated with each object and a pixel grid associated with each fidelity code, wherein a pixel grid for the pixels associated with an object having a higher object fidelity level has more pixels per area than a pixel grid associated with an object having a lower object fidelity level;

a non-parallelized graphics pipeline being configured to compute the color for each pixel and pixel coverage data;

a fluffing logic being configured to provide the pixel data for objects having lower fidelity level sub-pixels;

a depth buffer being configured to resolve visual priority of the pixels;

a frame buffer being configured to store final pixel color;

an anti-aliasing filter being configured to perform anti-aliasing on the pixel data stored in the frame buffer; and a delay logic being configured to provide the fidelity code associated with an object to at least one of the render controller, the graphics pipeline, the fluffing logic, the depth buffer, and the frame buffer, as the object is being rendered; and wherein the fluffing logic is configured to provide the pixel data to at least one of the depth buffer and the frame buffer in parallel for a plurality of pixels touched by an object with the lower fidelity level using a parallel write, the parallel write accomplished despite the non-parallelized graphics pipeline by taking one pixel out of the graphics pipeline and writing the one pixel into four or more pixels at the same time into the depth buffer or the frame buffer and wherein the pixel data is written in sequence for a plurality of pixels touched by an object with a higher object fidelity level.

* * * * *